United States Patent [19]
Tsujimoto et al.

[11] 3,754,455
[45] Aug. 28, 1973

[54] MOTOR DRIVEN STILL CAMERA

[75] Inventors: Kayoshi Tsujimoto, Osaka City;
Yoshio Kuramoto, Toyonaka City;
Toshio Kobori, Sakai City, all of Japan

[73] Assignee: Minolta Camera Kabushiki Kaisha, Osaka, Japan

[22] Filed: Sept. 24, 1971

[21] Appl. No.: 183,603

[30] Foreign Application Priority Data
Oct. 7, 1970 Japan........................... 45/88480
Oct. 30, 1970 Japan........................... 45/96084
Nov. 26, 1970 Japan........................... 45/105205

[52] U.S. Cl. .......... 95/31 EL, 95/11.5 R, 95/31 AC, 95/53 EA
[51] Int. Cl. ............................................. G03b 19/04
[58] Field of Search ................. 95/31 EL, 11.5 R, 95/31 AC, 53 EA

[56] References Cited
UNITED STATES PATENTS
| | | | |
|---|---|---|---|
| 3,434,405 | 3/1969 | Friedman | 95/31 EL |
| 3,520,391 | 7/1970 | Graham | 95/31 EL UX |
| 3,594,747 | 7/1971 | Cronin | 95/31 EL |
| 3,581,647 | 6/1971 | Maronde | 95/31 EL |

*Primary Examiner*—Robert P. Greiner
*Attorney*—Craig, Antonelli and Hill

[57] ABSTRACT

In a still camera having a motor for advancing a film, the motor is actuated by means of a trigger-signal which is to be produced after an adjusted delay time after deenergization of an electromagnet for holding a previously opened shutter in the open state to the start of rotation of the motor. By adjusting the pause time appropriately, the film starts advancing without redundant delay, thereby enabling the efficient consecutive taking of many pictures over a predetermined period of time.

25 Claims, 6 Drawing Figures

| EXPOSURE TIME \ FILM ADVANCING PERIOD | 1/1.5 SECOND ms | 1 SECOND ms | 2 SECOND ms | 4 SECOND ms | 8 SECOND ms | 15 SECOND ms |
|---|---|---|---|---|---|---|
| 1/1000 SECOND | 342 | 675 | 1,675 | 3,675 | 7,675 | 14,675 |
| 1/500 SECOND | 341 | 674 | 1,674 | 3,674 | 7,674 | 14,674 |
| 1/250 SECOND | 339 | 677 | 1,672 | 3,672 | 7,672 | 14,672 |
| 1/125 SECOND | 335 | 668 | 1,668 | 3,668 | 7,668 | 14,668 |
| 1/60 SECOND | 327 | 660 | 1,660 | 3,660 | 7,660 | 14,660 |
| 1/30 SECOND | 311 | 644 | 1,644 | 3,644 | 7,644 | 14,644 |
| 1/15 SECOND | 279 | 612 | 1,612 | 3,612 | 7,612 | 14,612 |
| 1/8 SECOND | 218 | 551 | 1,551 | 3,551 | 7,551 | 14,551 |
| 1/4 SECOND | 93 | 426 | 1,426 | 3,426 | 7,426 | 14,426 |
| 1/2 SECOND | | 176 | 1,176 | 3,176 | 7,176 | 14,176 |
| 1 SECOND | | | 676 | 2,676 | 6,676 | 14,676 |

MOTOR DRIVEN STILL CAMERA

BACKGROUND OF THE INVENTION

This invention relates to a still camera having a means for automatically advancing the film by means of an electric motor.

Known motor driven still cameras have been so constituted that a shutter which has been opened by pressing a switch release button is held in an open state by an electromagnetic means, then the holding is released by means of a delayed signal which is produced after a predetermined time from the pressing of the release button. In such known cameras, the constitution has been such that a film advancing motor is controlled by a mechanical switch which is mechanically interlocked to the shutter, so as to be closed after a fixed pause time from the closing of the shutter. Since the fixed pause or delay time from the closing of the shutter to the closing of the switch is redundant for a short exposure time and the fixed pause time as well as a delay time from the close of switch to acceleration of the motor is not negligibly short, a considerably accumulated delay time amounts results. Such accumulated delay time hinders the taking of many pictures over a predetermined period of time.

SUMMARY OF THE INVENTION

Accordingly, it is the purpose of the present invention to provide an improved motor-driven still camera, wherein the film-advancing motor is actuated by means of a trigger-signal which is produced after an automatically selected minimum pause time subsequent to deenergization of an electromagnet, which holds a previously opened shutter in the open state.

DETAILED DESCRIPTION OF THE INVENTION

Figure 1:
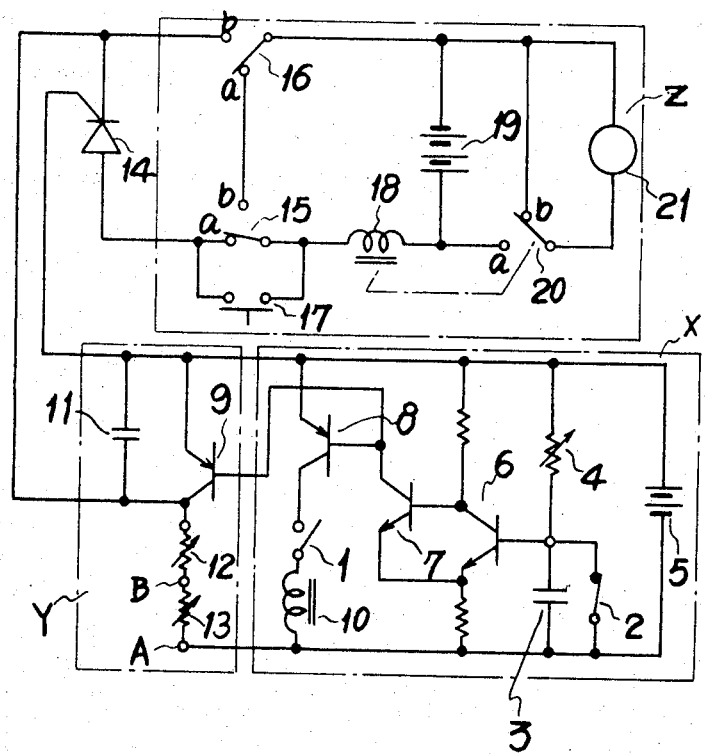
FIG. 1 is a circuit diagram of one example of a motor-driven still camera embodying the present invention.

In FIG. 1, a block X indicates a shutter circuit, wherein a main switch 1 is interlocked to a release switch button of a still camera so as to be closed when the button is pressed and to remain closed until the shutter of the camera is closed after an exposure. Another switch 2 is so constituted as to be opened when the shutter is opened and closed when a shutter cocking means, interlocked to a film advancing means, cocks the shutter immediately upon completion of the film advancing. A battery 5 is provided for operating the circuit X and a circuit Y. A capacitor 3 and a variable resistor 4 constitute a timer circuit and transistors 6 and 7 constitute a modified Schmitt circuit for driving transistors 8 and 9. Initially, since the voltage across both terminals of the capacitor 3 is very low, the transistor 6 is non-conductive while the transistors 7, 8 and 9 become conductive, thereby energizing an electromagnet 10 which is connected in series with the transistor 8 through switch 1. The electromagnet 10 is provided for holding the previously opened shutter in an open state while energized.

When the voltage of the capacitor 3 becomes high as a consequence of charge accumulation, so as to reach the trigger-level of the Schmitt circuit, the transistors change their state oppositely, making the transistor 6 conductive and the transistors 7 non-conductive, thereby imparting a delayed signal to the transistors 8 and 9. Accordingly, the transistor 9 becomes non-conductive, deenergizing the electromagnet 10 and hence, closing the shutter.

Exposure time, namely, the opened period of the shutter, is determined by a time constant defined by the capacitance of the capacitor 3 and the resistance of the variable resistor 4. For variable resistor 4, a photoconductive element such as a cadmium sulfide element can be used in order to attain an automatic exposure control function.

The block Y indicates a delay circuit wherein the base of a transistor 9 is connected to the collector of the transistor 7. The transistor 9 becomes non-conductive when the transistor 6 is conductive. Accordingly, a capacitor 11, both terminals of which are connected across the collector and emitter of the transistor 9, starts charging through the series-connected variable resistors 12 and 13. When the voltage of the capacitor reaches a certain value, thyristor 14 receives a voltage that is sufficient for triggering.

The pause time between the occurrence of the delay signal from the transistor 7 to transistor 9 and the triggering of the thyristor 14 depends on the time constant of the timer circuit consisting of the capacitor 11 and series-connected variable resistors 12 and 13.

Figure 2:
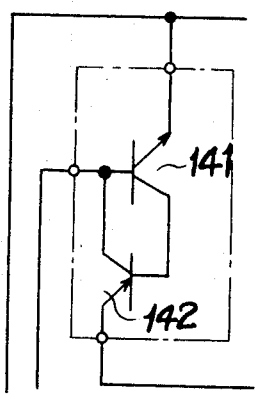
FIG. 2 is a circuit diagram of a modified part usable in place of a part of the example of FIG. 1.

In place of the thyristor 14, a combination of transistors 141 and 142 connected as shown in FIG. 2 can be employed as a switching element.

A block Z indicates a circuit for driving a film-advancing motor 21, wherein a switch 15 is so constituted that the switch 15 normally is switched to side $a$ and is switched to side $b$ during the period when the release switch button is pressed. Another switch 16 is interlocked with an automatic film-advancing mechanism in such a manner that the switch 16 is switched to side $a$ only when the advance of a frame is finished, and is switched to side $b$ for the rest of the period. A switch 17 is provided for selecting consecutive photographing when closed, while switch 17 is open for non-consecutive photographing. A change-over switch 20 is a switch driven by energization of a relay coil 18. A battery 19 is provided for driving the motor 21.

NON CONSECUTIVE PHOTOGRAPHING

Since the switch 16 is initially connected to side $a$, and the switch 15 is switched to side $b$ by pressing the release switch button, the relay coil 18 is connected to the battery 19 and energized, thereby switching the switch 20 to side $a$. Thereupon, the motor starts rotating by receiving current from the battery 19. However, the rotation lasts only a short time, since the film advancing means moves and soon causes interlocking switch 16 to switch to side $b$, deenergizing the relay coil 18 and thereby causing the switch 20 to switch to side $b$ to short-circuit the motor 21 for braking. This rotation takes place immediately after pushing down the release switch button and lasts for a very short period and, therefore, the opening of the shutter is delayed.

The shutter which has been opened by pressing the release button is closed upon deenergization of the electromagnet 10 caused by the first delayed signal from the transistor 7. Then after a predetermined pause time, the thyristor 14 receives the triggering signal at its control electrode from the delay circuit Y, and the triggering signal remains thereafter. Accordingly, when the release switch button is reset, and hence, the switch 15 is switched to side $a$ and also the switch 16 is switched to side $b$, the thyristor 14 becomes conductive, allowing current to flow through the relay coil 18. Consequently, the switch 20 again switches to side $a$, actuating the motor 21 to advance the film for the next exposure.

When the film advance is completed after a predetermined degree of rotation of the film-advancing means, the switch 16 is again switched to side $a$, which is the resting side. Accordingly, the thyristor 14 turns off to its non-conductive state, and the switch 20 changes to side $b$, for braking the motor 21 to stop. Thus, the system completes one exposure and one film-advancing cycle, and comes to a state of rest.

CONSECUTIVE PHOTOGRAPHING

Consecutive photographing is attained by closing the switch 17, and keeping the release button pressed. Operating as above, the aforementioned cycle of photographing is obtained in consecutive repetition. Namely, the switch 15 is switched to side $b$ and the switch 17 is closed, and therefore, even when the switch 16 switches to side $a$ at the completion of the film-advancing, the relay coil 18 remains energized, thereby keeping the motor rotating to immediately start the next photographing step. Of course, the shutter is mechanically interlocked with the film-advancing means in such a known manner that the shutter opens upon completion of the film-advance if the release switch button is kept pressed. In order to obtain a high rate of photographing over a determined period of time, namely, to attain minimum pause time from the completion of the closing of the shutter to the start of the film-advance, it is necessary to adjust the resistances of the variable resistors 12 and 13 appropriately.

The variable resistor 12 is for adjusting the calibration of the automatically adjusted resistance of the resistor 13. The other variable resistor 13 is adjusted by being interlocked to the selections of the photographing time period and exposure time.

Provided that the resistance of the variable resistor 12 is so calibrated that a pause time from the closing of the shutter to the start of the film advancing is nil when the variable resistor 13 is set to zero resistance, then the pause time can be extended by increasing the resistance of the resistor 13. The photographing period, consisting of the exposure time from opening to closing of the shutter, pause time and the time required for advancing the film, is selected to a desired length by selecting the resistance of the variable resistor 13 in response to the photographing period and the exposure time.

Figures 3, 4:
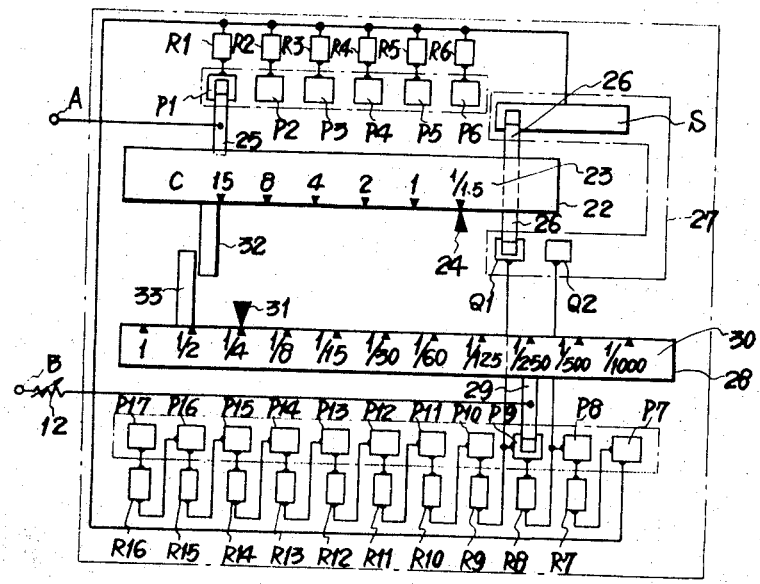
FIG. 3 is a plan view of a variable resistor of the camera shown in FIG. 1.
FIG. 4 is a table indicating relations between photographing periods exposure times and pause times of picture taking.

As indicated in FIG. 3, the variable resistor 13 preferably comprises a number of resistors R1–R6 and a selection switch system for obtaining a desired resistance across the terminals A and B. The resistors R1–R6 are resistors to be selected by being interlocked to a dial for selecting the photographing period. The resistors R7–R16 are resistors to be selectively connected in series by being interlocked to a dial for selecting the exposure time. When the advancing period dial for setting the photographing period is shifted rightward, so that a pointer 24 of the dial plate 22 points to a numeral, for instance, 4 (seconds), a moving contact 25, which is mechanically fixed to the plate 22 and electrically connected to a terminal A, contacts the fixed contact P4. Also, a similar moving contact 26 fixed to the plate 22 leaves the fixed contact S. Accordingly, when the exposure dial plate 28 is positioned as indicated in FIG. 3, namely the pointer 31 points to ¼ second exposure time and a moving contact 29 fixed to the plate 28 contacts the fixed contact P9, resistors R4, R7 and R8 are connected in series across terminals A and B. When the exposure dial plate 28 is shifted leftward so that a numeral, for instance, 1/30 second of the plate 28 is indexed by the pointer 31, the resistance between the terminals A and B is selected for setting appropriate pause time for 1/30 second exposure. The exposure dial plate 28 is to be adjusted to correspond to the resistance of the variable resistor 4, or to be preferably interlocked to the variable resistor 4.

Projections 32 and 33 projecting from the plates 22 and 28, respectively, are for preventing improper combination of exposure setting against advance period setting. Namely, as can be understood from a table shown in FIG. 4, there are some unrealizable combinations between exposure time and advance period in consecutive photographing. For instance, advance period of 1/1.5 sec. against exposure time of one-half sec. or 1 sec. is practically impossible and, accordingly, such a combination is prevented by engagement of the projections 32 and 33. If the advancing period is selected at 1/1.5, the exposure time inevitably becomes one-fourth second.

By indicating the photographing period which is a period of time from the release to the next release $t1$, the pause time which is the period from the completion of closing of the shutter to the start of the motor 21 $t4$, the exposure time which is the period from the release to the completion of closing of the shutter $t3$, and the film advancing time which is the period from starting of winding or advancing of the film to the next release of the shutter $t2$, the relations between $t1$, $t2$, $t3$ and $t4$ are as follows:

$$t4 = t1 - t2 - t3$$

FIG. 4 indicates the pause time $t4$ of the still camera shown in FIGS. 1 and 3, for various combinations between the exposure time $t3$ and the photographing period $t1$.

As indicated in FIG. 3, one end of each of the resistors R1–R6 is commonly connected to the short-circuit plate S. In this example, the short-circuit plate S contacts either contact Q1 or Q1 when the dial plate 22 is set to select the photographing period of 1 second or 1/1.5 second. The contacts Q1 and Q2 are connected to the junction point between the resistors R7 and R8 and the junction point between the resistors R8 and R9, respectively. Accordingly, in the example of FIG. 3, wherein some exposure time is unrealizable for the photographing period of 1 second and 1/1.5 second, the resistors R7 and R8 of the series connection of resistors for defining the exposure time are short-circuited and omitted from the series connection, by means of the above-mentioned connection between the short-circuit plate S and the contact Q1 or Q2 through the moving contact 26. Such a short-circuit is necessary for the following reason. If resistor R7 or R8 is not short-circuited for a selected photographing period of, for instance, 1/1.5 second, at any exposure time of one-fourth to one-thousandth, which is shown as being possible for consecutive photographing in the table of FIG. 4, the photographing period is extended from that of the selected period, by the time length of 750 milliseconds, when the photographing period is 1/1.5 second, the time length being a difference between the exposure times of the realizable one-fourth second and the unrealizable 1 second. However, since the resistors R7 and R8, which are unnecessary for selection of 1/1.5 second and 1 second photographing periods, are short-circuited, these photographing periods are precisely maintained during consecutive photographing.

As described above, the still camera according to the present invention provides an exact photographing period for various exposure times, while preventing unrealizable combinations of exposure time and photographing period.

MODIFIED EXAMPLE FOR FLASH PHOTOGRAPHING

Figure 5:
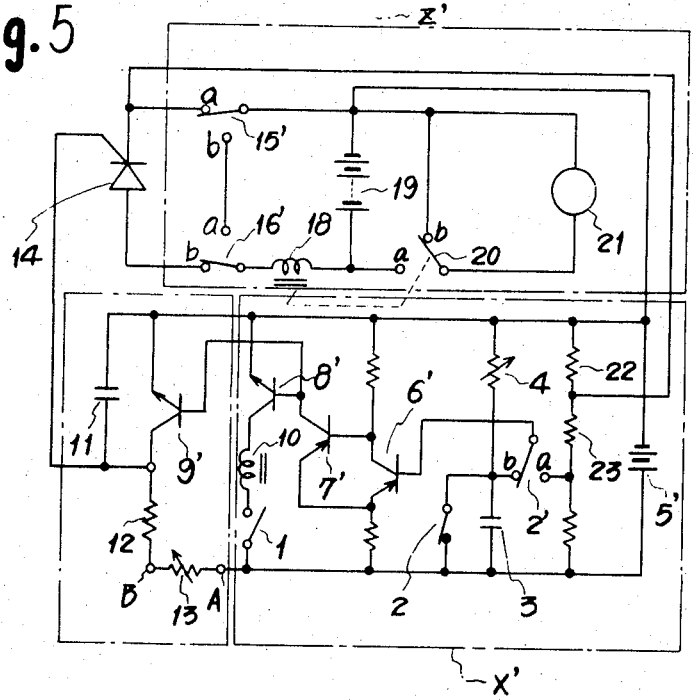
FIGS. 5 and 6 are circuit diagrams of modified examples of the invention, respectively.

FIG. 5 shows a modified example of the present invention, namely, a still camera capable of flash photographing.

The constitution of the camera is almost the same as that of the aforementioned example shown in FIG. 1, but a battery 5' is connected in the opposite direction of battery 5 and accordingly, transistors 6'7'8' and 9' are of a type opposite to those of the transistors 6, 7, 8 and 9. Switches 15' and 16'which work in the same manner as switches 15 and 16, are connected in the places corresponding to the switches 16 and 15, respectively. A voltage dividing network consisting of resistors 22, 23 and 24 is connected across the battery 5'. A change-over switch 2' is provided to connect the base of the transistor 6' to a higher dividing point in the dividing network or alternatively to the junction point between the capacitor 3 and the resistor 4. The change-over switch 2' is for selecting flash photographing by switching it to side *a* and selecting the normal photographing by switching it to side *b*. Both ends of the resistor 22 in the dividing network are connected across the *a* side of the switch 15'.

FLASH PHOTOGRAPHING

When the switch 2' is switched to side *a* for flash operation, the system works as follows:

The switch 15' is switched to side *b* while the release switch button is pressed. At first, the release switch button is pressed to open the shutter. Since the resistance of the resistor 22 is made greater than the resistance of the resistors 23 and 24, the transistor 6' is made non-conductive and hence, the transistors 7'8' and 9' are made conductive, thereby holding the shutter in an open state by means of an energized electromagnet 10. However, when the release switch button is reset after the flash exposure time from the pressed state, the switch 15' is switched to side *a* and, consequently, both ends of the resistor 22 are short-circuited by the *a* side of the switch 15' and, hence, the voltage across the resistor 24 increases, thereby changing the states of the transistors 6'7'8' and 9' oppositely. Namely, the transistor 6' becomes conductive, and the transistors 7'8' and 9' become non-conductive. Consequently, the electromagnet 10 is deenergized and hence, the shutter is closed. Also, as a result of the transistor 9' becoming non-conductive, the capacitor 11 starts charging.

After a certain time, as a result of charge-up of the voltage on the capacitor 11, the thyristor 14 is triggered and therefore, the current from the battery 19 flows through the relay coil 18, since the switch 16' is already at side *b*. Consequently, the switch 20 is switched to side *a* and hence, the motor 21 rotates to advance the film.

Figure 6:
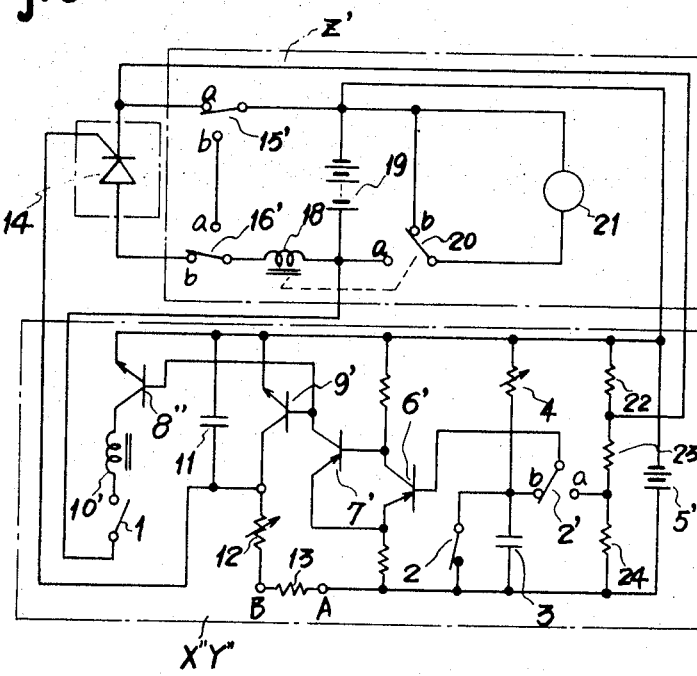

FIG. 6 shows another modified example of a still camera capable of flash photographing. This example features a circuit including the transistor 8'' and the electromagnet 10' for holding the shutter which circuit is connected so as to be energized by current from the battery 19, provided for driving the motor 21 and hence, is greater in current-feeding capacity than the battery 5' for feeding the electronic circuit block X''Y''. In this example the transistor 8'' corresponds to the transistor 8' of FIG. 5. Since the electromagnet 10' is not fed from the battery 5' which is a small battery installed in the camera body, the battery 5' need not feed current for the long time of the flash exposure to the electromagnet 10 which consumes a considerable amount of current. Accordingly, it is possible to extend the life of the battery 5' installed in the camera body. The larger battery 19 is preferably installed outside the camera body, for instance, in a camera holding handle, in an easily replaceable manner.

We claim:

1. A motor driven still camera comprising a shutter, an electric motor for advancing the film, an electric power source for energizing said motor, shutter holding means for holding the previously opened shutter in the open state, and an electric circuit for controlling said shutter holding means and said motor, said electric circuit comprising a first delay circuit for producing an output signal to actuate the shutter holding means so as to close the shutter after a predetermined time interval from actuation of said shutter holding means motor control means for controlling energization of said motor including a semiconductor switching device by which said motor is selectively connected to said electric power source; and a second delay circuit responsive to the output signal of said first delay circuit to render said semiconductor switching device conductive a predetermined time after receipt of the output of said first delay circuit.

2. A motor driven still camera according to claim 1 further comprising an exposure-time-setting member and a photographing-period-setting member, wherein said second delay circuit comprises a capacitor, a first variable resistor means and a second variable resistor means connected in series with each other, said second variable resistor means including a first group of fixed resistors and a first selection switch which are coupled with each other to obtain a first resistance having a value corresponding to the setting of shutter speed, and a second group of fixed resistors and a second selection switch which are coupled with each other to determine a second resistance having a value corresponding to the setting of photographing period, the resistance value of said second variable resistor means being determined as the value of a combined resistance of said first and second resistances.

3. A motor driven still camera according to claim 2, wherein said switches include a short-circuiting means for short-circuiting such time defining resistors for making time differences for unrealizable exposure time at a selected photographing period.

4. A motor driven still camera of claim 3, wherein said switches have a mechanical interlocking means for preventing selection of unrealizable combinations between the exposure time and the photographing period.

5. A motor driven still camera of claim 1, wherein said first delay circuit includes a transistor triggering circuit having output circuit through which said shutter holding means is energized, and further comprising a release switch being closed in response to manual handling of a shutter release member to energize at least said shutter holding means, and a means for forcedly controlling the performance of said transistor triggering circuit so as to deenergize said shutter holding means in response to resetting manual handling of the shutter releasing member whereby bulb exposure can be effected.

6. A still camera including a shutter system for controlling duration of time during which a film is exposed to light from an object scene, means for effecting the shutter closing operation, a motor for advancing the film, an electric circuit for controlling said means for effecting the shutter closing operation and said motor, and a release switch for connecting an energizing circuit to said electric circuit, said electric circuit comprising:
  first means for generating a first signal after a lapse of predetermined time from the actuation of said release switch, for actuating said means for effecting the shutter closing operation to terminate the exposure;
  second means responsive to said first signal generated by said first means for generating a second signal delayed a predetermined period of time with respect to said first signal;
  a motor control circuit, coupled to said film advance motor, for actuating said motor, so as to advance said film and cock said shutter subsequent to the closure of said shutter; and
  a semiconductor switching device connected between said second means and said motor control circuit for maintaining the energization of said motor by said motor control circuit in response to said second signal.

7. A camera according to claim 6, wherein said second means comprises a resistor-capacitor delay circuit and means for applying a charging voltage to said capacitor in response to said first signal generated by said first means, said resistor-capacitor delay circuit including first and second variable resistor elements, one of said variable resistor elements including a first selector switch with variable resistance settings for selecting the duration of the photographing, in accordance with the magnitude of a selected resistance, coupled to said capacitor and a second selector switch with a number of variable resistor settings for selecting exposure time.

8. A camera according to claim 7, wherein said second means further includes means for short-circuiting selected ones of said number of variable resistor settings of said second selector switch in response to the setting of said first selector switch, so as to prevent an unrealizable combination of exposure time and photographing period.

9. A camera according to claim 8, wherein said short-circuiting means comprises a mechanical interlocking mechanism provided between the resistor selectors of each of said first and second selector switches.

10. A camera according to claim 7, wherein said semiconductor switching device comprises a pair of transistors the bases and collectors of which are cross connected to each other, while the emitter thereof are respectively connected to said motor control circuit and the base of one of said transistors is connected to said second means.

11. A camera according to claim 6, wherein said camera further comprises means for forcedly controlling the performance of said first means in a manner to produce said first signal in response to resetting a manual handling of a shutter release member whereby bulb exposure can be effected.

12. A camera according to claim 11, wherein said first means comprises a resistor-capacitor timing circuit, a source of potential for charging said capacitor through said resistor, and a transistor triggering circuit for controlling said second means, and wherein said means for controlling the operation of said first means comprises a voltage divider network connected in parallel with said resistor-capacitor timing circuit of said first means and a control switch for switchably connecting said transistor triggering circuit to said resistor-capacitor timing circuit or said voltage divider network.

13. A camera according to claim 12, wherein said second means comprises a resistor-capacitor delay circuit and a delay circuit transistor connected thereto and to said transistor triggering circuit for enabling the charging of the capacitor therein, and wherein said motor control circuit comprises first and second switches, connected to said semiconductor switching device and an energy relay switch for coupling energizing supply voltage to said motor.

14. A camera according to claim 13, wherein said energizing relay switch comprises a relay coil and an electromagnetically operating switch arm coupled thereto, said switch arm being connected to short-circuit said motor in a first position and to provide said supply voltage thereto in a second position.

15. A camera according to claim 14, wherein said first and second switches of said motor control circuit each include contacts for by-passing said semiconductor switching device to energize said energizing relay directly therethrough and said second switch further includes an additional pair of contacts for permitting consecutive film advance of said motor during the closure thereof.

16. A camera according to claim 15, further including conductor means for connecting a portion of said resistor-divider network to said first switch of said motor control circuit.

17. A camera according to claim 15, wherein said motor control circuit comprises a source of driving voltage for said motor and means for connecting said source of driving voltage to said shutter control coil.

18. A camera according to claim 6, wherein said second means comprises a resistor-capacitor delay circuit and a transistor triggering circuit connected thereto and to said semiconductor switching device for controlling the switching device in accordance with the charged voltage of the capacitor, charging to the capacitor being initiated in response to said first signal.

19. A camera according to claim 18, wherein said means for actuating shutter closing operation is so arranged to hold the shutter open from the actuation of said release switch until said first means generates the first signal, and wherein said first means includes an output transistor shunted across said capacitor and being made conductive while said shutter is held open.

20. A camera according to claim 19, wherein said motor control circuit comprises first and second switches, connected to said semiconductor switching device and an energy relay switch for coupling energizing supply voltage to said motor.

21. A camera according to claim 20, wherein said energizing relay switch comprises a relay coil and an electromagnetically operating switch arm coupled thereto, said switch arm being connected to short-circuit said motor in a first position and to provide said supply voltage thereto in a second position.

22. A camera according to claim 21, wherein said first and second switches of said motor control circuit each include contacts for by-passing said semiconductor switching device to energize said energizing relay directly therethrough and said second switch further includes an additional pair of contacts for permitting consecutive film advance of said motor during the closure thereof.

23. A motor driven still camera including a shutter mechanism for controlling duration of time during which a film is exposed to scene light, a motor for advancing the film, means for effecting shutter closing, an electric circuit for controlling said means for effecting shutter closing and said motor, and a release switch for closing energizing circuit for said electric circuit in response to shutter releasing operation, said electric circuit comprising:

first means for generating a first signal after a lapse of a predetermined exposure time from the actuation of said release switch, for actuating said means for effecting shutter closing to terminate the exposure;

a motor control circuit, coupled to said film advance motor, for actuating said motor, so as to advance said film subsequent to the closure of said shutter;

a semiconductor switching device connected to said motor control circuit for maintaining the energization of said motor by said motor control circuit; and second means responsive to said first signal generated by said first means for timing the actuation of said semiconductor switching device.

24. A motor driven still camera including a shutter mechanism for controlling duration of time during which a film is exposed to scene light, a motor for advancing the film, means for effecting shutter closing, an electric circuit for controlling said means for effecting shutter closing and said motor, and a release switch for closing energizing circuit for said electric circuit in response to shutter releasing operation, said electric circuit comprising:

first means for generating a first signal after a lapse of predetermined exposure time from the actuation of said release switch, for actuating said means for effecting shutter closing to terminate the exposure;

a motor control circuit, coupled to said film advance motor, for energizing said motor, so as to advance said film subsequent to the closure of said shutter;

a semiconductor switching device connected to said motor control circuit for actuating said motor control circuit in response to the generation of said first signal.

25. A motor driven still camera according to claim 24, further comprising an electric power source, and a relay switch means connected between said power source and said motor, said relay switch is controlled by said semiconductor switching device so that the relay switch is closed with the actuation of the semiconductor switching device.

* * * * *

UNITED STATES PATENT OFFICE
CERTIFICATE OF CORRECTION

Patent No. 3,754,455        Dated August 28, 1973

Inventor(s) Kayoshi TSUJIMOTO, Yoshio KURAMOTO, Toshio KOBORI

It is certified that error appears in the above-identified patent and that said Letters Patent are hereby corrected as shown below:

Title page, as it reads now:

[30] Foreign Application Priority Data

October 7, 1970    Japan     45/88480
        October 30, 1970   Japan     45/96084
        November 26, 1970 Japan     45/105205

Title page, as it should read:

[30] Foreign Application Priority Data

October 7, 1970          Japan    45/88480
        October 30, 1970        Japan    45/96084
        November 26, 1970      Japan    45/105250

Signed and Sealed this

Eleventh Day of October 1977

[SEAL]

Attest:

RUTH C. MASON          LUTRELLE F. PARKER
*Attesting Officer*     *Acting Commissioner of Patents and Trademarks*